United States Patent [19]

Obara

[11] Patent Number: 4,499,359

[45] Date of Patent: Feb. 12, 1985

[54] SHAPE COMPENSATING METHOD FOR WIRE-OUT ELECTRIC DISCHARGE MACHINING

[75] Inventor: Haruki Obara, Sagamihara, Japan

[73] Assignee: Fanuc Ltd, Minamitsuru, Japan

[21] Appl. No.: 414,361

[22] PCT Filed: Dec. 23, 1981

[86] PCT No.: PCT/JP81/00403

§ 371 Date: Aug. 26, 1982

§ 102(e) Date: Aug. 26, 1982

[87] PCT Pub. No.: WO82/02354

PCT Pub. Date: Jul. 22, 1982

[30] Foreign Application Priority Data

Dec. 30, 1980 [JP] Japan .................... 55-186743

[51] Int. Cl.³ ............................................. B23P 1/08
[52] U.S. Cl. ................................. 219/69 W; 219/69 M
[58] Field of Search ............ 219/69 M, 69 E, 69 W, 219/69 V, 69 R, 68

[56] References Cited

U.S. PATENT DOCUMENTS 4,081,652  3/1978  Janicke et al. .................. 219/69 W
4,314,133  2/1982  Pfau et al. ...................... 219/69 W

FOREIGN PATENT DOCUMENTS 2826489  3/1979  Fed. Rep. of Germany ... 219/69 W
51-43296  4/1976  Japan .
54-12049  5/1979  Japan .
54-99294  8/1979  Japan .

OTHER PUBLICATIONS

AGIE, "Force Effects in ED–Cutting", pp. 1–8, 5/31/76, vol. 118, #1.

Primary Examiner—M. H. Paschall
Attorney, Agent, or Firm—Staas & Halsey

[57] ABSTRACT

The flexure value of a wire electrode in a machining tangential direction and the flexure value in a radial direction are obtained by a computerized numerical control device using the wire electrode speed of an electric discharge machine, the width of a machined groove and the flexure value during straight machining. The corrected position of the wire electrode is calculated using the above two flexure values. Distributed pulses are provided by pulse distributors on the basis of the calculated movement values relative to a current position, and servo motors in the electric discharge machine are driven by the distributed pulses fed through moving direction controllers, thereby to perform shape compensation in wire-cut electric discharge machining.

1 Claim, 14 Drawing Figures (a)

(b)

SHAPE COMPENSATING METHOD FOR WIRE-OUT ELECTRIC DISCHARGE MACHINING

The present invention relates to a shape compensating method used in wire-cut electric discharge machining, and more particularly to a shape compensating method which can automatically correct a machining error based on the flexure of a wire electrode due to electric discharge.

A wire-cut electric discharge machine is such that a predetermined gap is maintained between a wire electrode and a workpiece, while a voltage is applied therebetween to cause a spark discharge across the gap, whereby the workpiece is cut by the discharge energy. Accordingly, when the workpiece is moved relative to the wire on the basis of machining command data, it can be machined into a desired shape. In the wire-cut electric discharge machine, however, when the wire electrode advances in a groove in the workpiece in a predetermined direction while cutting the workpiece, a pressure attributed to the electric discharge develops between the wire electrode and the workpiece, with the result that the wire electrode is pushed back in the direction opposite to the advancing direction. Therefore, the wire electrode lies behind the position of wire guides used therewith. That is, the wire electrode flexes. When performing the electric discharge machining of a straight line, the flexure is not a serious problem. In contrast, in a case where the advancing direction of the workpiece has been changed into the orthogonal direction on the basis of a machining command in order to machine a corner, the discharging part of the wire electrode is dragged inward on account of the flexure of the wire electrode due to the electric discharge, and unlike the commanded shape, the machining path of the groove deviates on the inner side considerably, so that the machined shape becomes blunt. Also when performing a machining operation to create a circular arc, a similar error develops. This necessitates a countermeasure in which the flexure value of the wire electrode is measured in advance, and when machining the corner, the workpiece is moved to a somewhat greater extent in correspondence with the flexure value. In the prior art, however, no appropriate control technique for compensating and controlling these errors has been established.

SUMMARY OF THE INVENTION

An object of the present invention is to provide a shape compensating method in wire-cut electric discharge machining which can correct the path of a wire electrode by determining flexure value, thereby reducing machining errors. To accomplish this object, the extent of flexure the wire electrode of an electric discharge machine has at a certain feed speed and under a specified machining groove width and wire diameter, is calculated by an NC (numerical control) in advance, and the path of the wire electrode is corrected by the use of the resulting flexure values $D_T$ and $D_R$ in a tangential direction, respectively and radial direction ($D_R = 0$ for rectilinear motion). More specifically, the correlation equations between the original coordinate positions $(x_i, y_i)$ of the wire electrode and the corrected coordinate positions $(X_i, Y_i)$ thereof are obtained beforehand, and the corrected coordinate positions are successively calculated by the use of the known flexure values. Accordingly, letting $(X_{i-1}, Y_{i-1})$ denote a corrected position a short time ago (this position being known) and $(X_i, Y_i)$ denote the next corrected position calculated, movement values $\Delta X$ and $\Delta Y$ are obtained as follows:

$$\Delta X = X_i - X_{i-1}$$

$$\Delta Y = Y_i - Y_{i-1}$$

In accordance with the movement values $\Delta X_n$ and $\Delta Y_n$, pulse distributions are executed to rotate motors, whereby the flexure values in a straight machining operation and a circular arc machining operation are compensated.

DETAILED DESCRIPTION OF THE PREFERRED EMBODIMENTS

Figure 1:
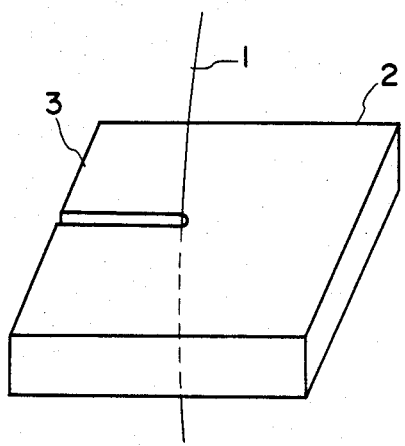
FIG. 1 is an explanatory view of wire-cut electric discharge machining.
Figure 2:
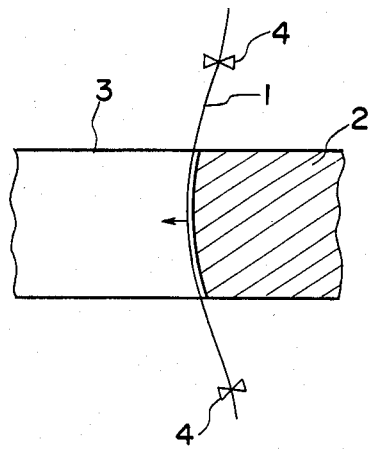
FIG. 2 is a view for elucidating the flexure of a wire electrode.
Figure 3:
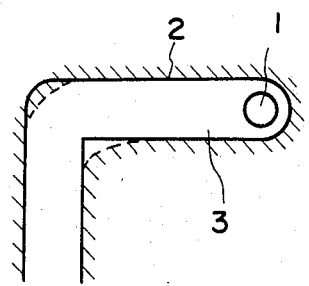
FIGS. 3 and 4 are explanatory views for elucidating machining errors caused by the flexure.
Figure 4:
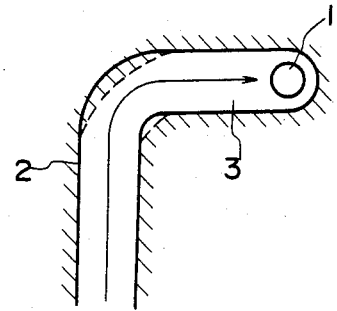

In a wire-cut electric discharge machine, when a wire electrode 1 advances in a groove 3 in a workpiece 2 in a predetermined direction while cutting the workpiece, as shown in FIG. 1, a pressure attributed to an electric discharge develops between the wire electrode 1 and the workpiece 2 as illustrated in FIG. 2, with the result that the wire electrode 1 is pushed back in the direction of the arrow, namely, in the direction opposite to the advancing direction. Therefore, the wire electrode 1 lies behind the position of wire guides 4, 4. That is the wire electrode 1 flexes. When performing the electric discharge machining of a straight line, the flexure is not a serious problem. In contrast, in a case where the advancing direction of the workpiece has been changed to the orthogonal direction on the basis of a machining command in order to machine a corner, as illustrated in FIG. 3, the discharging part of the wire electrode is dragged inward on account of the flexure of the wire electrode due to the electric discharge, and unlike the commanded shape (indicated by a solid line), the machining path of the groove 3 deviates to the inner side considerably, so that the machined shape becomes blunt, as indicated by dotted lines. Also, when performing a machining operation to create a circular arc as shown in FIG. 4, a similar error develops.

The shape compensating method of the present invention, which eliminates such disadvantages and reduces machining errors, will now be described in detail in conjunction with an embodiment of the present invention with reference to the accompanying drawings.

In the straight machining operation, the flexure of the wire electrode appears in the reverse direction (tangential direction) to the machining advance direction due to the discharge pressure during machining. In case of machining a circular arc or a corner, the wire electrode flexes, not only in the tangential direction, but also inwardly of the circular arc or corner, in other words, in the radial direction because the quantities of machining of an outer side and an inner side with respect to the center locus of the wire electrode are unequal. In order to perform the wire-cut electric discharge machining at high precision, therefore, the machining needs to be controlled in consideration of both the force acting in the tangential direction and the force acting in the radial direction of the wire machining path. In the present invention, accordingly, the wire path is corrected in consideration of these forces, namely, the tangential and radial flexure values, whereby the shape is more accurately machined.

Hereunder, calculating equations for obtaining the flexure value $D_T$ in the tangential direction and the flexure value $D_R$ in the radial direction will be first derived, and the steps of a method of correcting a machining path by the use of the values $D_T$, $D_R$ will be subsequently described in succession.

Figure 5:
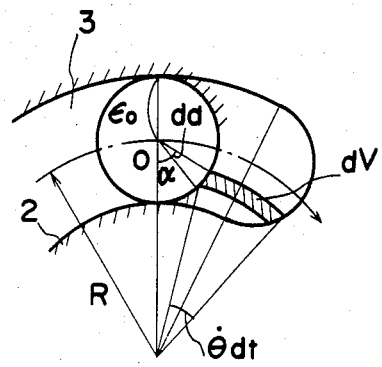
FIGS. 5, 6, 7 and 8 are explanatory diagrams for calculating flexure values in a tangential direction and a radial direction.

(A) Derivation of Equations for Calculating Tangential and Radial Flexure Values $D_T$, $D_R$:

It is now supposed that, as shown in FIG. 5, a wire electrode 1 machines a workpiece 2 by moving along a circular arc locus of radius R. The width of a machined groove is assumed to be $2\epsilon_o$.

When the wire electrode 1 has moved by an angle $\dot{\theta}dt$ within a period of time dt, the time differential value $d\dot{V}$ of the quantity of machining at a position of angle $\alpha$ in FIG. 5 becomes as follows, with the workpiece assumed to have a unit thickness:

$$d\dot{V} = \frac{d}{dt}(dV)$$

$$= (R - \epsilon_o \cos \alpha)\dot{\theta} \, dt \cdot \epsilon_o \, d\alpha \sin \alpha / dt$$

Then, letting F denote a feed speed, $$F = R\dot{\theta} \quad (1)$$

Therefore, the following holds:

$$d\dot{V} = F \epsilon_o \left( \sin \alpha - \frac{\epsilon_o}{R} \sin \alpha \cdot \cos \alpha \right) d\alpha \quad (2)$$

When $d\dot{V}$ is integrated from $\alpha = 0$ to $\pi$ under the condition that the electric discharge occurs on only the front surface of the wire electrode 1, the following is obtained:

$$\dot{V} = 2F\epsilon_o \quad (3)$$

Figure 6:
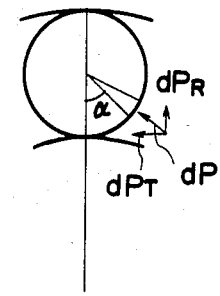

Here, a pressure P acting on the wire electrode 1 at the position of the angle $\alpha$ in FIG. 5 is considered in the state of FIG. 6, and the following assumptions ① and ② are made:

① The pressure which is exerted on the wire electrode surface by the electric discharge is proportional to a discharging frequency, which in turn is proportional to the quantity of machining per unit time, in other words, the machining speed.

② The pressure acts perpendicularly to the wire electrode surface.

Accordingly, the radial force $dP_R$ exerted on the wire electrode 1 by the quantity of machining $d\dot{V}$ per unit time becomes:

$$dP_R = dP \cdot \cos \alpha \quad (4)$$

$$= K \, d\dot{V} \cos \alpha$$

$$= K F \epsilon_o \left( \sin \alpha - \frac{\epsilon_o}{R} \sin \alpha \cdot \cos \alpha \right) d\alpha \cdot \cos \alpha$$

When $dP_R$ is integrated from $\alpha = 0$ to $\pi$ ($dP_R$ being directed outward), the result becomes:

$$P_R = \frac{2}{3R} KF\epsilon_o^2 \quad (5)$$

In Equation (5), K is a proportional constant. In addition, $P_R$ originally varies if the energy of one shot of the electric discharge differs. In this regard, however, it is assumed here that the energies of the respective shots of the electric discharge are equal (C and V in ($CV^2/2$) are held constant in the machining).

Likewise, the tangential force $dP_T$ on the wire electrode 1 becomes:

$$dP_T = dP \cdot \sin \alpha$$

$$= K F \epsilon_o \left( \sin \alpha - \frac{\epsilon_o}{R} \sin \alpha \cdot \cos \alpha \right) d\alpha \cdot \sin \alpha$$

When $dP_T$ is integrated from $\alpha = 0$ to $\pi$, the result becomes:

$$P_T = \frac{\pi}{2} \cdot KF\epsilon_o \quad (6)$$

As apparent from Equations (3) and (6), $\dot{V}$ and $P_T$ are independent of the circular arc radius R. It can therefore be said that they are the quantity of machining and the force on the wire electrode 1 in the straight machining operation, respectively.

Figure 7:
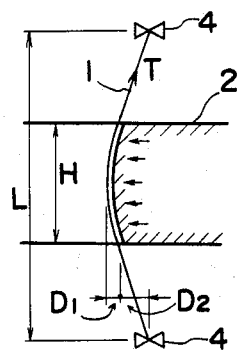

Referring to FIG. 7, the flexure value of the wire electrode 1 can be approximately expressed as follows:

$$D_1 = PH/4T$$

$$D_2 = (L-H)P/2T$$

$$D = D_1 + D_2 = K_2 P \quad (7)$$

where P denotes the pressure, H the thickness of the workpiece 2, L the vertical distance between guides 4, 4, and T the tension of the wire.

As seen from Equation (7), the flexure value D is proportional to the force acting on the wire electrode 1. In consideration of the assumption ①, therefore, the following equations hold when $D_o$ denotes the flexure value during the straight machining at a machining speed $F_o$, while $D_T$ and $D_R$ denote the flexure values based on the tangential force $P_T$ and the radial force $P_R$, respectively:

$$\frac{D_T}{D_o} = \frac{P_T}{P_o} = \frac{F}{F_o} \quad (8)$$

$$\frac{D_R}{D_o} = \frac{P_R}{P_o} = -\frac{4}{3\pi} \cdot \frac{F}{F_o} \cdot \frac{\epsilon_o}{R} \tag{9}$$

Equation (9) can be derived using Equations (6) and (8).

Figure 8:
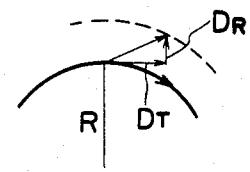

The tangential and radial flexure values $D_T$ and $D_R$ are obtained from the above equations (8) and (9) when the machined groove width $2\epsilon_o$ and the flexure value $D_o$ during the straight machining at the machining speed $F_o$ have been measured. It can be said that proper machining is carried out at all times by correcting the wire locus to the extents of the values $D_T$ and $D_R$. That is, in the case of machining a circular arc in FIG. 8, a locus which precedes by $D_T$ and $-D_R$ in the tangential direction and the radial direction may be depicted. When machining a straight line, $D_R = 0$ holds.

In calculating $D_T$ and $D_R$, $D_o$, $F$, $F_o$, $\epsilon_o$ and $R$ are required. The radius $R$ is obtained from machining data, while the machined groove width $2\epsilon_o$ is known in advance by actually test-machining the workpiece and measuring the dimension, and they are stored in an NC. Further, $F$ denotes the actual feed speed and is known. In order to calculate $D_T$ and $D_R$, accordingly, the NC must know the flexure value $D_o$ during the straight machining and the machining speed $F_o$ during this straight machining.

Figure 9:
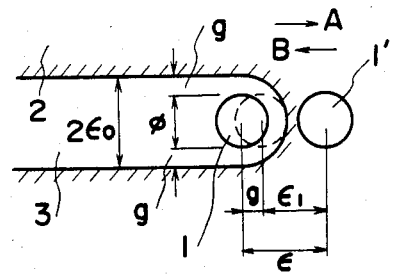
FIG. 9 is an explanatory diagram of a method of measuring a flexure value in a straight machining operation.

(B) Measurement of Flexure Value $D_o$ During Straight Machining:

FIG. 9 is an explanatory view for measuring the flexure value $D_o$. The measurement of the flexure value $D_o$ during the straight machining is carried out as stated below.

In the course of straight machining, the electric discharge is once stopped at a predetermined measurement point (FIG. 9). Since the cessation of the electric discharge results in nullifying the pressure of the electric discharge, the wire electrode 1 having flexed is drawn toward the guides to come into contact with the workpiece 2. When the wire electrode 1 has come into contact with the workpiece 2, a contact sensing device to be described later senses this contact.

From the state in which the wire electrode 1 lies in contact with the workpiece 2, the wire electrode 1 is retracted relative to the workpiece 2 along the machining path. In the retraction control, a table on which the workpiece 2 is placed may be moved relative to the wire 1 in the direction of an arrow A, or the guides may be retracted relative to the workpiece in the direction of an arrow B in a wire-cut electric discharge machine of the construction in which the guides can be moved.

As the retraction control is continued, the contact between the wire electrode and the workpiece ends at any time. The retraction distance $D_o'$ from the discharge stopping position to the position where the contact between the wire electrode and the workpiece ends is measured, and is stored in a memory built in the NC.

When the true flexure value $D_o$ is subsequently calculated in accordance with the following equation, the measurement of the flexure value ends:

$$D_o = g + D_o' \tag{10}$$

Here, $g$ denotes the gap of the electric discharge, and it is obtained from the following equation when the width of the machined groove is indicated by $2\epsilon_o$ and the diameter of the wire by $\phi$ as shown in FIG. 9:

$$g = (2\epsilon_o - \phi)/2 \tag{11}$$

Accordingly, when the machined groove width $2\epsilon_o$ and the wire diameter $\phi$ are measured and entered into the NC in advance, the flexure value $D_o$ is found by executing the calculations of Equations (10) and (11). $F_o$ is stored in the NC as the machining speed in the $D_o$ measuring operation, simultaneously with $D_o$.

(C) Correction of Wire Path:

When the tangential and radial flexure values $D_T$ and $D_R$ have been obtained, the wire path is subsequently corrected.

Figure 10:
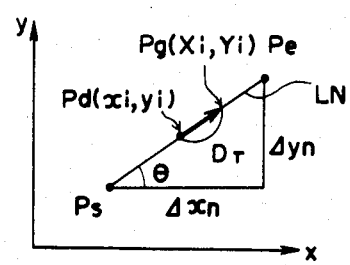
FIGS. 10 and 11 are explanatory diagrams for correcting wire paths in the straight machining operation and a circular arc machining operation, respectively.

FIG. 10 is an explanatory diagram in the case of correcting the wire path in the straight machining operation (when a G function instruction G01 is issued). $P_s$ denotes the starting point of a straight line LN, $P_e$ the end point thereof, $\Delta x_n$ and $\Delta y_n$ the incremental values of respective axes between the starting point and the end point, $P_d$ the original position of the wire having coordinate values $(x_i, y_i)$, and $P_g$ the corrected position of the wire having coordinate values $(X_i, Y_i)$. Since the distance between the positions $P_g$ and $P_d$ is $D_T$, the following equations hold between $x_i, y_i$ and $X_i, Y_i$:

$$\left. \begin{array}{l} X_i = x_i + D_T \cdot \cos\theta \\ Y_i = y_i + D_T \cdot \sin\theta \end{array} \right\} \tag{12}$$

$$\sin\theta = \Delta y_n / \sqrt{\Delta x_n^2 + \Delta y_n^2} = g_1$$

$$\cos\theta = \Delta x_n / \sqrt{\Delta x_n^2 + \Delta y_n^2} = f_1$$

Accordingly, letting $(X_{i-1}, Y_{i-1})$ denote the corrected position of a short time ago (known) and $(X_i, Y_i)$ denote the next corrected position, movement values $\Delta X$ and $\Delta Y$ are obtained from the following equations by the use of Equations (12):

$$\Delta X = X_i - X_{i-1}$$

$$\Delta Y = Y_i - Y_{i-1} \tag{13}$$

Pulse distributions are executed in accordance with the movement values $\Delta X_n$ and $\Delta Y_n$, to generate distributed pulses in numbers corresponding to these values $\Delta X_n$ and $\Delta Y_n$. Thenceforth, the flexure value $D_T$ in the straight machining operation can be compensated by similar processing.

It is also permissible to change the incremental command values $\Delta x_n$ and $\Delta y_n$ to:

$$\Delta x_n' = \Delta x_n \pm D_T \cos\theta$$

$$\Delta y_n' = \Delta y_n \pm D_T \sin\theta$$

on the basis of which rectilinear interpolations are performed. Here, the sign (positive or negative) depends upon the direction of straight machining.

FIGS. 11(a) and 11(b) are explanatory diagrams in the cases of correcting wire paths in the operation of machining a clockwise circular arc (G02 = "1") and in the operation of machining a counterclockwise circular arc (G03 = "1"), respectively. $P_d$ designates the original position of the wire having coordinate values $(x_i, y_i)$, $P_g(X_i, Y_i)$ the corrected position of the wire, $P_s(x_n, y_n)$ a starting point, and $P_e$ an end point. Now, (I, J) denote X- and Y-axial components from the starting point $P_s$ to the center of the circular arc, and $(\Delta x_n, \Delta y_n)$ denote incremental values from the starting point $P_s$ to the end point $P_e$, Then, the following holds in the first quadrant as to the clockwise circular arc:

$$\left. \begin{array}{l} X_i = x_i + D_T \cdot \sin\theta + D_R \cdot \cos\theta \\ Y_i = y_i - D_T \cdot \cos\theta + D_R \cdot \sin\theta \end{array} \right\} \quad (14)$$

$$\sin\theta = \frac{1}{R_n}(y_i - y_n - J) = g_2$$

$$\cos\theta = \frac{1}{R_n}(x_i - x_n - I) = f_2$$

On the other hand, the following holds as to the counterclockwise circular arc:

$$\left. \begin{array}{l} X_i = x_i - D_T \cdot \sin\theta + D_R \cdot \cos\theta \\ Y_i = y_i + D_T \cdot \cos\theta + D_R \cdot \sin\theta \end{array} \right\} \quad (15)$$

$$\sin\theta = \frac{1}{R_n}(y_i - y_n - J)$$

$$\cos\theta = \frac{1}{R_n}(x_i - x_n - I)$$

Accordingly, letting $(X_{i-1}, Y_{i-1})$ denote the corrected position of a short time ago (known) and $(X_i, Y_i)$ denote the next corrected position, $X_i$ and $Y_i$ are obtained from Equations (14) or (15), and movement values $\Delta X$ and $\Delta Y$ are calculated from Equations (13). When the motors are rotated by generating feed pulses in accordance with these movement values $\Delta X_n$ and $\Delta Y_n$, the flexure values in the operation of machining the circular arc can be compensated.

The compensations can also be executed by changing circular arc command values.

Figure 12:
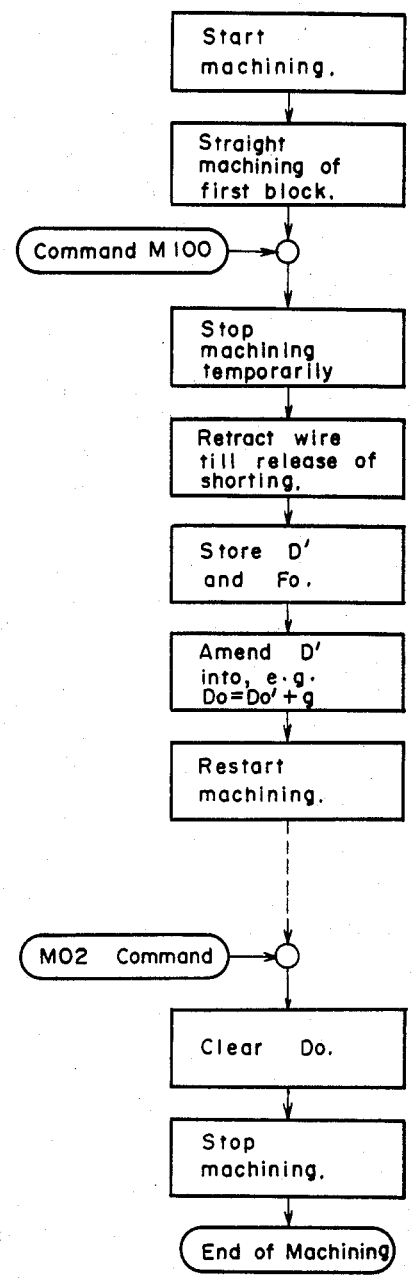
FIGS. 12 and 13 are flow diagrams of the method of the present invention.
Figure 13:
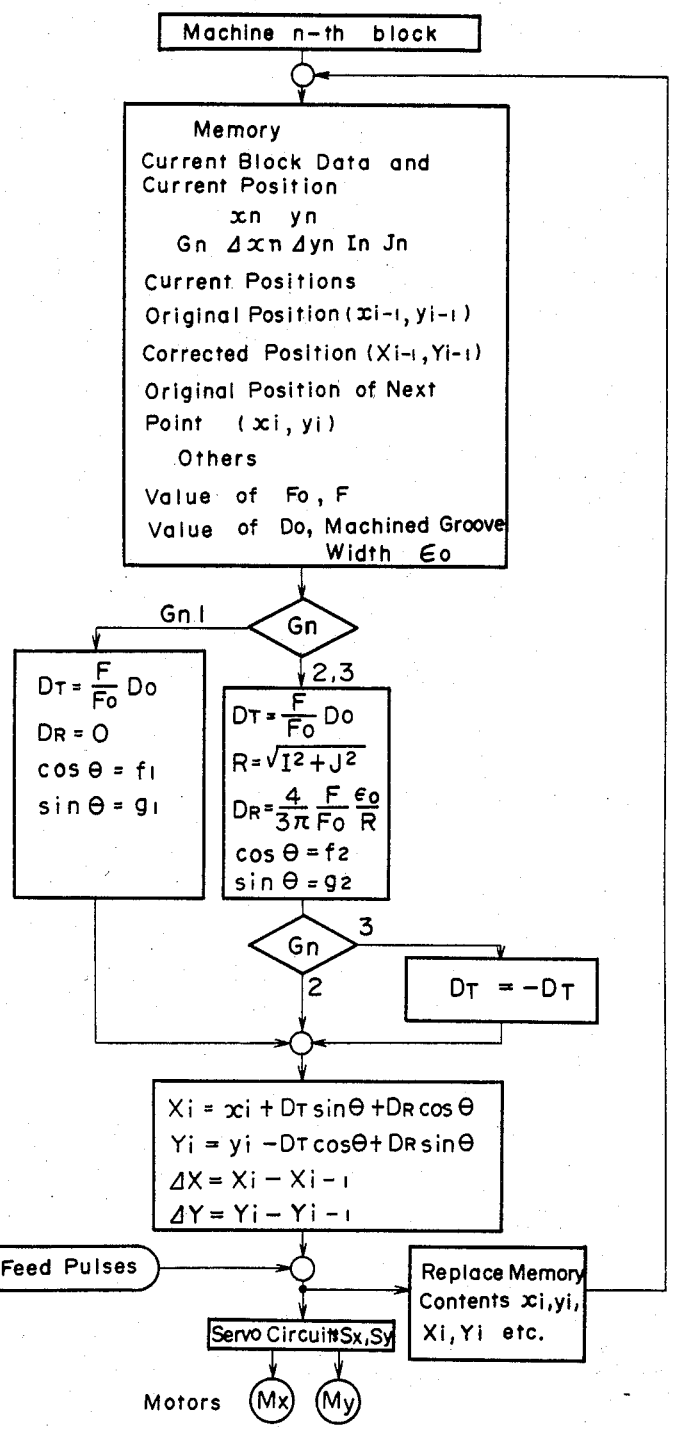

FIG. 12 is a flow diagram for measuring the flexure value $D_o$ during the straight machining in the wire-cut electric discharge machining according to the present invention, while FIG. 13 is a flow diagram of the shape compensating calculations.

In the machining program, an M code such as M100 is appointed in the first command straight block of machining or the command straight block directly preceding a part where the control is started. Owing to this appointment, the machining is stopped, and the wire electrode is retracted to automatically measure the flexure value $D_o$. In addition, at the end of the last machining operation, $D_o$ is usually cleared in the NC when M02 indicating the end of machining is commanded. This is intended to prevent any erroneous correction in the case where M100 is not appointed in the next machining (FIG. 12).

When the straight machining of one block has ended after starting the machining, M100 is commanded. Then, the machining is stopped, the wire electrode is retracted, the retraction distance $D_o'$ till the end of the shorting is stored, and $D_o'$ is amended into, e.g., $D_o' + g$, which is stored. Subsequently, machining is started again. In the machining of the n-th block, the starting point $x_n, y_n$, and command values $G_n, \Delta x_n, \Delta y_n, I_n$ and $J_n$ of the n-th block as to the original path have been given, the current position $x_{i-1}, y_{i-1}$ of the original path and the corrected position $X_{i-1}, Y_{i-1}$ are set, and the position $x_i, y_i$ of the original path to which the wire electrode ought to move next is set. The value $\epsilon_o$ is already stored in the NC, and so are $F_o$ and $D_o$. The feed speed F of the original path is also made known. Depending upon whether the groove is the straight line, clockwise circular arc or counterclockwise circular arc; 1, 2 or 3 is given as $G_n$.

Figure 11:
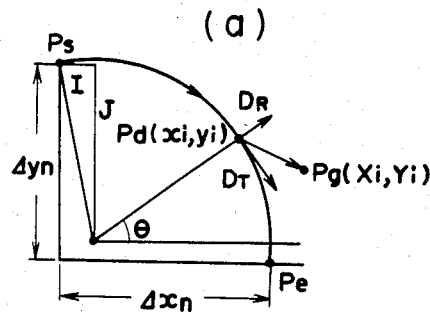
Figure 11:
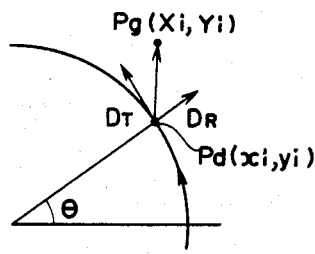

First, $D_T$ and $D_R$ are obtained in accordance with the value of $G_n$, and $\sin\theta$ and $\cos\theta$ indicated in FIG. 10 or FIG. 11 are obtained. From them, $X_i$ and $Y_i$ are obtained so as to find the values $\Delta X$ and $\Delta Y$ by which the wire electrode ought to move. The feed pulses are generated according to the values of $\Delta X$ and $\Delta Y$, and are delivered to servo circuits $S_x$ and $S_y$ so as to move the wire electrode by $\Delta X$ and $\Delta Y$. Thus, the servo circuits $S_x$ and $S_y$ rotate the motors $M_x$ and $M_y$. When the wire has moved, the values of the memory within the NC are replaced with new values, whereupon the control flow returns to the first step of the n-th block. When the machining of the n-th block has ended, the control flow shifts to the next block, and similar calculations are continued.

Since the value of the feed speed F is the speed in the original path, it is determined by the number of feed pulses per unit time. (It is not the speed in the corrected path.)

When M02 is commanded upon the end of the machining, the value of $D_o$ is cleared and the machining is stopped.

Figure 14:
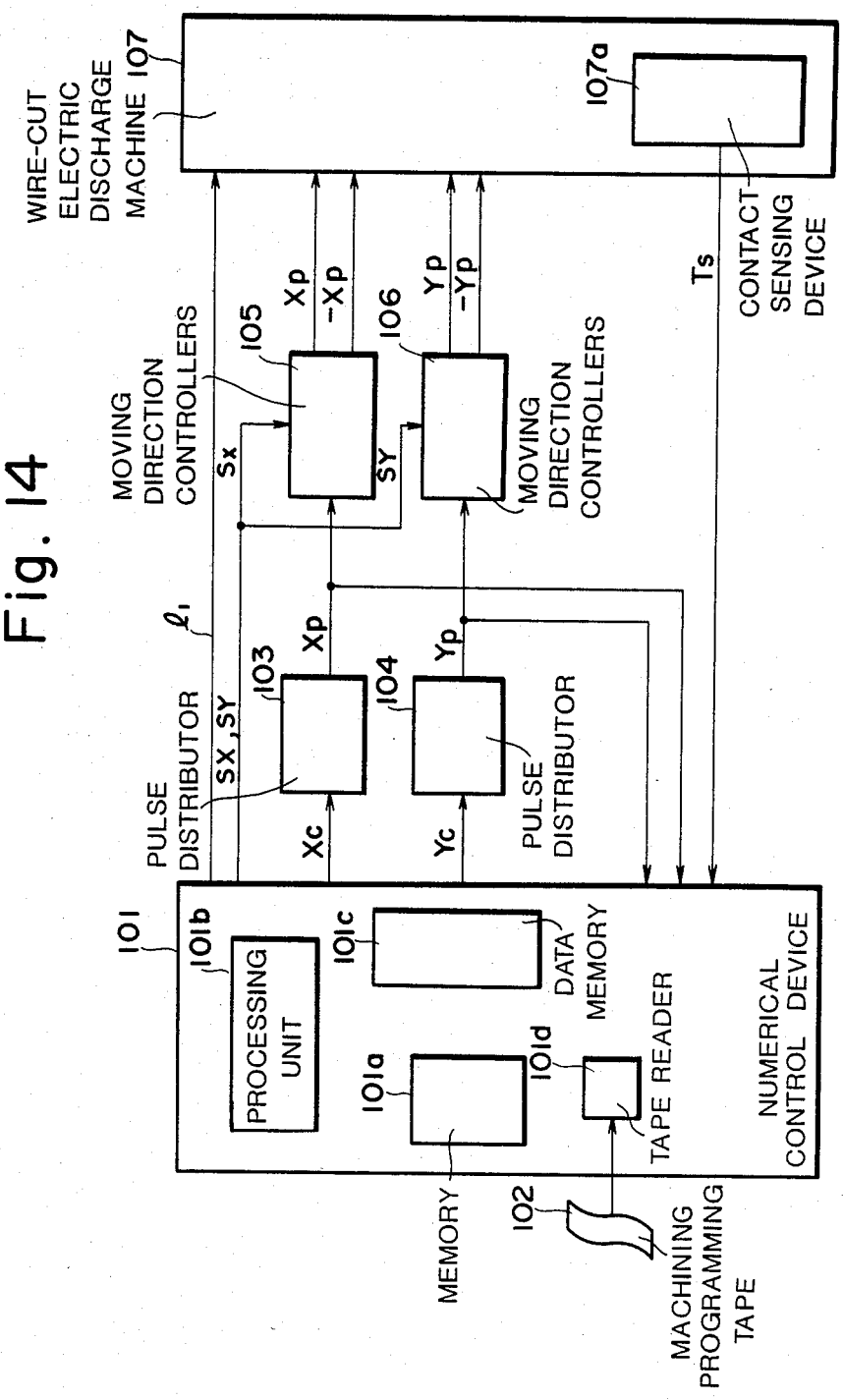
FIG. 14 is a block diagram for realizing the shape compensating method according to the present invention.

FIG. 14 is a block diagram for realizing the shape compensating method according to the present invention.

Referring to the figure, numeral 101 designates an NC (numerical control device) constructed of a microcomputer. It includes a memory 101a which stores a processing program for compensating the shape and a control program for executing the other numerical control processing, a processing unit 101b which executes predetermined processing on the basis of commands from the control program and a machining program to be described below, a data memory 101c which stores data and other calculated results, a tape reader 101d, etc. Numeral 102 designates a machining program tape, in which are punched machining data such as electric discharge machining paths and machining speeds. The auxiliary function instructions M100 for the flexure value measurement are entered in suitable places of the machining program. Numerals 103 and 104 indicate pulse distributors which execute predetermined pulse distribution calculations on the basis of movement value commands $X_c$ and $Y_c$ issued from the NC, so as to provide distributed pulses $X_p$ and $Y_p$, respectively. Numerals 105 and 106 indicate moving direction controllers, which change the signs of the distributed pulses and then provide the resulting pulses in the retraction control. Shown at numeral 107 is a wire-cut electric discharge machine, which is provided with a contact sensing device 107a for detecting the contact between the wire and the workpiece.

The difference $\Delta R$ between the radii of the regular path as commanded and the corrected path according to the present invention becomes as follows, and is understood to be greatly influential: Assuming by way of example $\epsilon_o = 0.15$ mm, $R = 1.5$ mm, $F/F_o = 1$ and $D_o = 0.1$ mm, $$D_R = -0.0042 \text{ mm}$$

$D_T = 0.1$ mm

Therefore, $$\Delta R = \sqrt{D_T^2 + (R - D_R)^2} - R = 0.0075 \text{ mm}$$

($\Delta R = 0.0033$ mm when $D_R$ is not taken into account.) In addition, when $R = 0.3$ mm $$\Delta R = 0.0362 \text{ mm}$$

To be noted when applying the present method is that, since $\alpha$ in FIG. 5 takes $0 - \pi$ into consideration in the calculations, a path which causes the electric discharge in only one surface in the advancing direction must not be traced. Accordingly, $R - \epsilon_o > 0$ must be maintained.

It is premised that any corner part is provided with R. This is no problem in practical use because, when actually fabricating an extrusion mold, all the corner parts must be provided with R in order to bring concave and convex parts into exact correspondence.

As set forth above, when cutting a workpiece into a desired shape by the use of an electric discharge machine in accordance with the present invention, the flexure of a wire electrode based on pressure developed between the wire electrode and the workpiece is calculated in each of a straight line machining operation and a circular arc machining operation, and a machining path is successively corrected on the basis of the calculated values, whereby a desired machining path involving no error is attained. In the straight line machining operation, even when the advancing direction is orthogonally changed, the component by which the wire electrode is dragged can be compensated, while in the circular arc machining operation, a similar error involved can be corrected, so that products of high machining accuracy can be fabricated. Accordingly, when forming a metal mold or the like by the use of the electric discharge machine, the metal mold can be endowed with a good quality, and a product by the metal mold becomes one of good quality scarcely having an error with respect to the original mold. The present invention is applicable to all the other fields in which electric discharge machining is carried out.

What is claimed is:

1. A shape compensating method for correcting a machining error causing deviation from original coordinates of a wire electrode during straight or curved wire-cut, electro-discharge machining of a workpiece caused by an electrically discharged, wire electrode, comprising the steps of:

(a) subjecting the workpiece to trial straight machining at a trial feed speed $F_0$ by placing the wire electrode at a first position which is a predetermined gap away from the workpiece and applying voltage therebetween to cause a spark discharge across the gap;

(b) stopping trial straight machining by stopping the discharge at a second position relative to the workpiece, wherein stopping the electric discharge draws the wire electrode into contact with the workpiece at a third position;

(c) retracting the wire electrode away from the third position in the direction of the machined path and determining a retraction distance $D_0'$ from the discharge stopping position to the position where the wire elctrode and the workpiece leave contact;

(d) determining a flexure value $D_0$ at the trail feed speed $F_0$ during straight machining by the following formula:

$$D_0 = g + D_0',$$

wherein g is the gap of the electric discharge as determined by the formula:
 $g = (2\epsilon_0 - \phi)/2$, and wherein
 $2\epsilon_0$ is the width of the machined groove,
 $\phi$ is the diameter of the wire,
 and both $2\epsilon_0$ and $\phi$ are premeasured values;

(e) determining the first flexure value $D_T$ in a machining tangential direction which is the direction opposite the direction of machining and a second flexure value $D_R$ in a radial direction which is the direction inwardly of a curve being machined by the following equations:

$$D_T = \frac{F}{F_0} \cdot D_0$$

$$D_R = \frac{4}{3\pi} \cdot \frac{F}{F_0} \cdot \frac{\epsilon_0}{R} \cdot D_0$$

wherein F is the prevailing feed speed and R is the machining radius, and wherein R is infinite for straight machining; and (f) correcting the machining path by using means for correcting the original coordinates of the wire electrode based on the tangential flexure value $D_T$ and the radial flexure value $D_R$ obtained from steps (a)-(e).

* * * * *

UNITED STATES PATENT AND TRADEMARK OFFICE
CERTIFICATE OF CORRECTION

PATENT NO. : 4,499,359

DATED : February 12, 1985

INVENTOR(S) : Obara

It is certified that error appears in the above-identified patent and that said Letters Patent is hereby corrected as shown below:

On the title page;

(54) Line 2, "WIRE-OUT" s/b --WIRE-CUT--.
(56) Foreign Patent Documents
"54-12049 5/1979 Japan" s/b --54-120495 9/1979 Japan--.

Col. 1
Line 2, "WIRE -OUT" s/b --WIRE-CUT--;
Line 60, "respectively" s/b --respectively,--.

Col. 2
Line 21, "FIGS. 5, 6, 7" s/b --a new paragraph--.

Col. 3
Line 26, s/b a new paragraph;
Line 59, "V=2F$\varepsilon_0$" s/b --$\dot{V}$=2F$\varepsilon_0$--.

Col. 5
Line 29, s/b --a new paragraph--.
Col. 6
Line 12, s/b --a new paragraph--.

Col. 7
Line 6, "$P_c$," s/b --$P_c$.--.

Signed and Sealed this

Second Day of July 1985

[SEAL]

Attest:

DONALD J. QUIGG

Attesting Officer   Acting Commissioner of Patents and Trademarks